US012565784B2

(12) United States Patent
Allison et al.

(10) Patent No.: US 12,565,784 B2
(45) Date of Patent: Mar. 3, 2026

(54) MOBILE STAGE DEPLOYMENT SYSTEM AND METHOD

(71) Applicant: Progressive Products, Inc., Pittsburg, KS (US)

(72) Inventors: Todd N Allison, Pittsburg, KS (US); James E. Pingree, Pittsburg, KS (US); James Waller, Lawrence, KS (US); Justin W. Brown, Pittsburg, KS (US)

(73) Assignee: Progressive Products, Inc., Pittsburg, KS (US)

( * ) Notice: Subject to any disclaimer, the term of this patent is extended or adjusted under 35 U.S.C. 154(b) by 212 days.

(21) Appl. No.: 18/222,659

(22) Filed: Jul. 17, 2023

(65) Prior Publication Data

US 2024/0018793 A1 Jan. 18, 2024

Related U.S. Application Data

(60) Provisional application No. 63/389,546, filed on Jul. 15, 2022.

(51) Int. Cl.
E04H 3/28 (2006.01)
B60P 3/025 (2006.01)

(52) U.S. Cl.
CPC .............. E04H 3/28 (2013.01); B60P 3/0252 (2013.01)

(58) Field of Classification Search
CPC ........... A63J 1/00; B60P 3/0252; B60P 3/025; E04B 1/34312; E04B 1/34317; E04H 3/28
See application file for complete search history.

(56) References Cited

U.S. PATENT DOCUMENTS

| | | | | | |
|---|---|---|---|---|---|
| 2,846,221 | A | * | 8/1958 | Skinner | A63J 1/00 |
| | | | | | 472/75 |
| 4,783,934 | A | * | 11/1988 | Langhart | E04H 3/10 |
| | | | | | 187/214 |
| 5,642,589 | A | * | 7/1997 | Miron | E04H 12/182 |
| | | | | | 52/118 |
| 6,102,155 | A | * | 8/2000 | Hood | A62B 1/00 |
| | | | | | 182/198 |
| 6,393,769 | B1 | * | 5/2002 | Mertik | E04H 3/28 |
| | | | | | 296/26.14 |

(Continued)

FOREIGN PATENT DOCUMENTS

KR 102445022 * 9/2022

OTHER PUBLICATIONS

Translation of KR 102445022 (Year: 2022).*

*Primary Examiner* — Jessica L Laux

(74) *Attorney, Agent, or Firm* — AVEK IP, LLC

(57) ABSTRACT

A mobile stage configured for reconfiguration between trailered and deployed configurations featuring a hydraulic ram with a lifting carriage for lifting towers and tower mast caps into place to raise a stage roof above a stage floor. Additional features include slide-out speaker wings which provide additional structural stability when stored within the stage structure, spanner beams that are folded flat inside the roof when the trailer is in the enclosed traveling position, and which can span the entire roof, meaning there are no areas of the roof where lights or equipment cannot be hung. It also creates a 1'×1' grid system to be used for both the hanging of equipment and the easy calculation of the load on each section of the roof.

3 Claims, 11 Drawing Sheets

(56) References Cited

U.S. PATENT DOCUMENTS

| | | | | |
|---|---|---|---|---|
| 8,678,941 B2* | 3/2014 | Bilsen | ..................... | A63J 1/00 |
| | | | | 472/75 |
| 8,978,311 B1* | 3/2015 | Uhl | ......................... | E04H 3/26 |
| | | | | 52/79.5 |
| 9,200,462 B2* | 12/2015 | Valente | ................ | B60P 3/0252 |
| 11,292,379 B2* | 4/2022 | Wilson, Sr. | ............... | B60J 7/08 |
| 2012/0277010 A1* | 11/2012 | Bilsen | ................. | B60P 3/0252 |
| | | | | 472/75 |
| 2015/0107164 A1* | 4/2015 | Jung | ................... | B60P 3/0252 |
| | | | | 52/7 |
| 2016/0009213 A1* | 1/2016 | Doucet | ................... | E04H 3/28 |
| | | | | 52/741.1 |

* cited by examiner

| Processor | 52 |
| Data Storage | 54 |
| Load Calc. Software | 56 |
| Wireless Connection | 58 |
| Computer | 50 |

MOBILE STAGE DEPLOYMENT SYSTEM AND METHOD

CROSS-REFERENCE TO RELATED APPLICATION

This application claims priority in U.S. Provisional Patent Application No. 63/389,546 Filed Jul. 15, 2022, which is incorporated herein by reference.

BACKGROUND OF THE INVENTION

1. Field of the Invention

The present invention relates generally to stages, and in particular to a mobile or portable stage for entertainment, instructional, educational and other presentations.

2. Description of the Related Art

Mobile stages enable entertainers and other presenters to set up relatively quickly in outdoor venues. For example, shows can be presented efficiently with minimal set up by transporting stages among different locations. Without limitation on the generality of useful applications of the present invention, such presentations can accommodate entertainment, education, instruction, marketing and campaigning.

Mobile stages can be pre-configured for particular presentations to minimize set up and reconfiguration between use and transport modes. For example, props, equipment, furnishings, musical instruments and lecterns can be stowed for transport, e.g, in a trailered position. Upon reaching a destination, a mobile stage can be relatively quickly reconfigured to a deployed position. After a presentation, the mobile stage can be returned to a trailered position ready for transport to the next venue.

Heretofore there has not been available a mobile stage with the advantages and features of the present invention.

BRIEF SUMMARY OF THE INVENTION

The present invention generally provides a mobile stage configured for reconfiguration between trailered and deployed configurations.

Tower lifting on large mobile stages are typically designed in one of two ways. The first method is to use a multi-stage hydraulic cylinder that can lift the towers a high as they need to go. The problem with multistage cylinders is the size, weight, cost, reliability, and stability. The second method used on large stages is a cascading design like those used on forklifts. These designs are partially hydraulic with additional movement provided by gears or pulleys in conjunction with cables, chains, or belts. The downside of this design is extra weight, maintenance, cost, and complexity. In both cases, there are considerable amounts of leaning of the towers during deployment.

The tower lifting system of the present invention is comprised of mast towers that are lifted by a 6 ft-throw solid square hydraulic ram that moves the towers in location in 6 ft increments with each tower being pinned in position as they are moved into place. There are multiple advantages to this system. First, the towers go up rigid reducing the amount of lean that occurs compared to other lifting systems. Not only is this safer, but this rigidity is required for one of the other new design features, a new spanner beam deployment system. Furthermore, the new tower design uses a (relatively) small 6 ft throw hydraulic ram. By using a smaller, simple, single-stage cylinder, the design eliminates the need to use a large multistage cylinder and/or another type of drive system. This reduces manufacturing cost, maintenance cost, weight, complexity, and stress on the hydraulic system. It also increases the useful life of the lift system and its safety of the stage during deployment.

All current flybar designs for large mobile stages have bolt-on flybars. These bars are very heavy and take multiple hours and numerous crew members to fasten them onto the front/back beam of the stage. Having external flybars also requires extra transport space to store the flybars when they are traveling to their destination. Moreover, if flybars are only needed for one side of the stage (either front or back), then bolting only one set onto the roof creates an imbalance and asymmetrical roof load which is a hazard when lifted.

The new flybar design of the present invention consists of a 21 ft flybar sandwiched in between two wider beams which make up the beams positioned at the front-of-stage and back-of-stage positions. These flybars are always stored in the upstage and backstage beams of the stage. When they are needed, they are unpinned, pulled out to length, and then re-pinned in place. This design enables a much easier deployment as well as an even load distribution upstage to downstage when the roof is being lifted. When retracted, the beam-in-beam sandwiched flybar design allows an extra 30% load capacity on the upstage and downstage beams. Furthermore, the design also significantly reduces time and the errors that can happen when bolting on a set of large set of flybars.

This new design has spanner beams that are folded flat inside the roof when the trailer is in the enclosed traveling position. When the stage is deployed the spanner beams are folded out and pinned in place. All previous stage mobile designs have spanner beams only in the middle of the roof, so they are out of the way of other roof beams when the roof is in the closed position.

The new folding design allows the spanner beams to completely span the roof structure when they are deployed and pinned in place. Having beams span the entire roof means there are no areas of the roof where lights or equipment cannot be hung. It also creates a 1'×1' grid system to be used for both the hanging of equipment and the easy calculation of the load on each section of the roof.

Because the new stage uses a 1'×1' grid system on the roof, a software with a simple graphic interface can be used showing each section of the grid can be used to calculate the load for each grid section. A person only needs to select the grid area on the interface to type in the weight they want to place there and get a calculation. The software will tell the user graphically if the weight is well with safety limits (green), within limits but should be checked by an engineer (yellow/orange), or completely outside safety limits (red). This simple software program, or Excel file, will simplify the planning process for a show and increase safety by reducing errors and taking guesswork out of the process.

BRIEF DESCRIPTION OF THE DRAWINGS AND IMAGES

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

II. Preferred Embodiment Mobile Stage System 2

Figure 1:
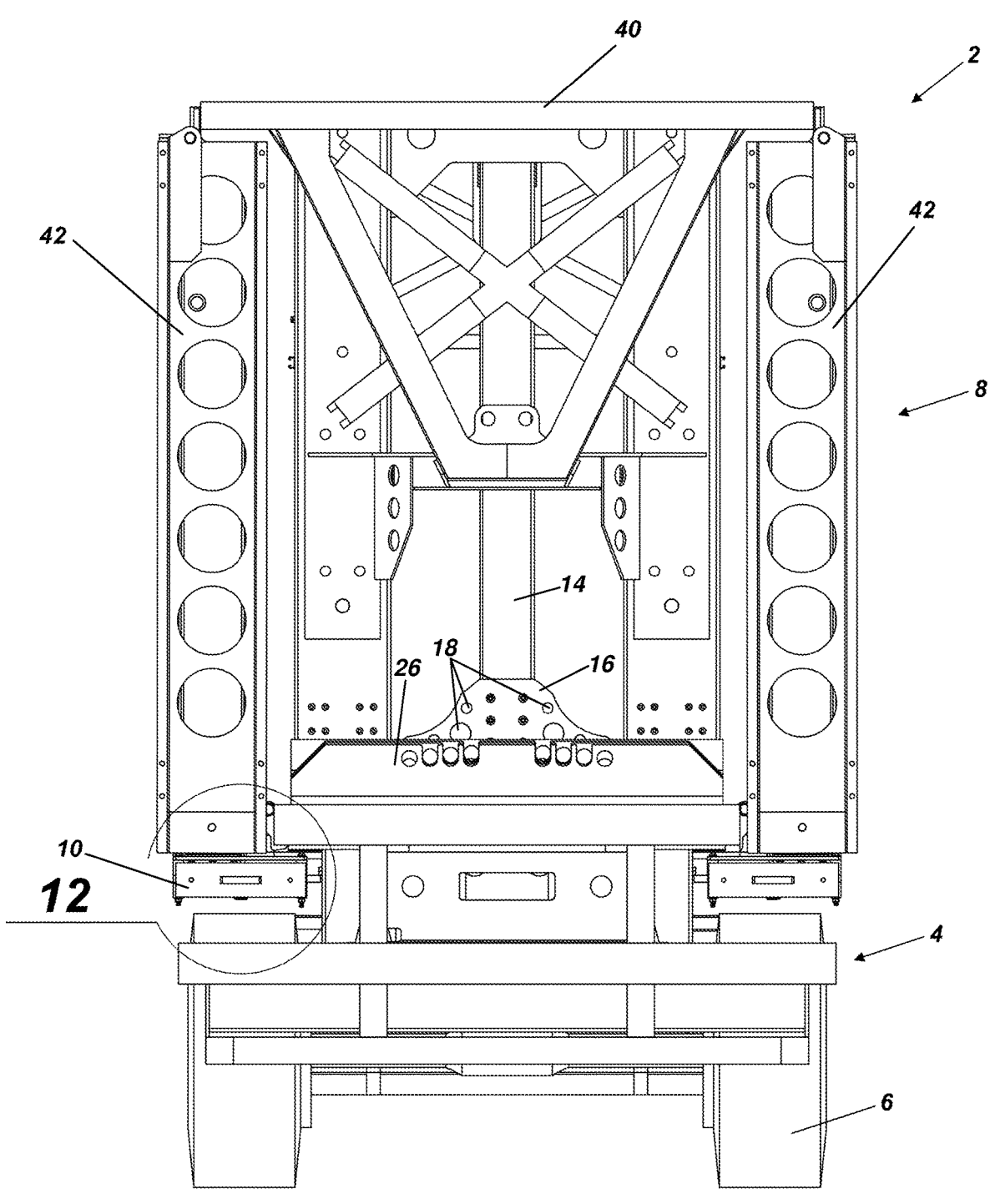
FIG. 1 is a rear elevational view of a preferred embodiment of the present invention shown in a first, stored orientation as part of a trailer assembly.
Figure 2:
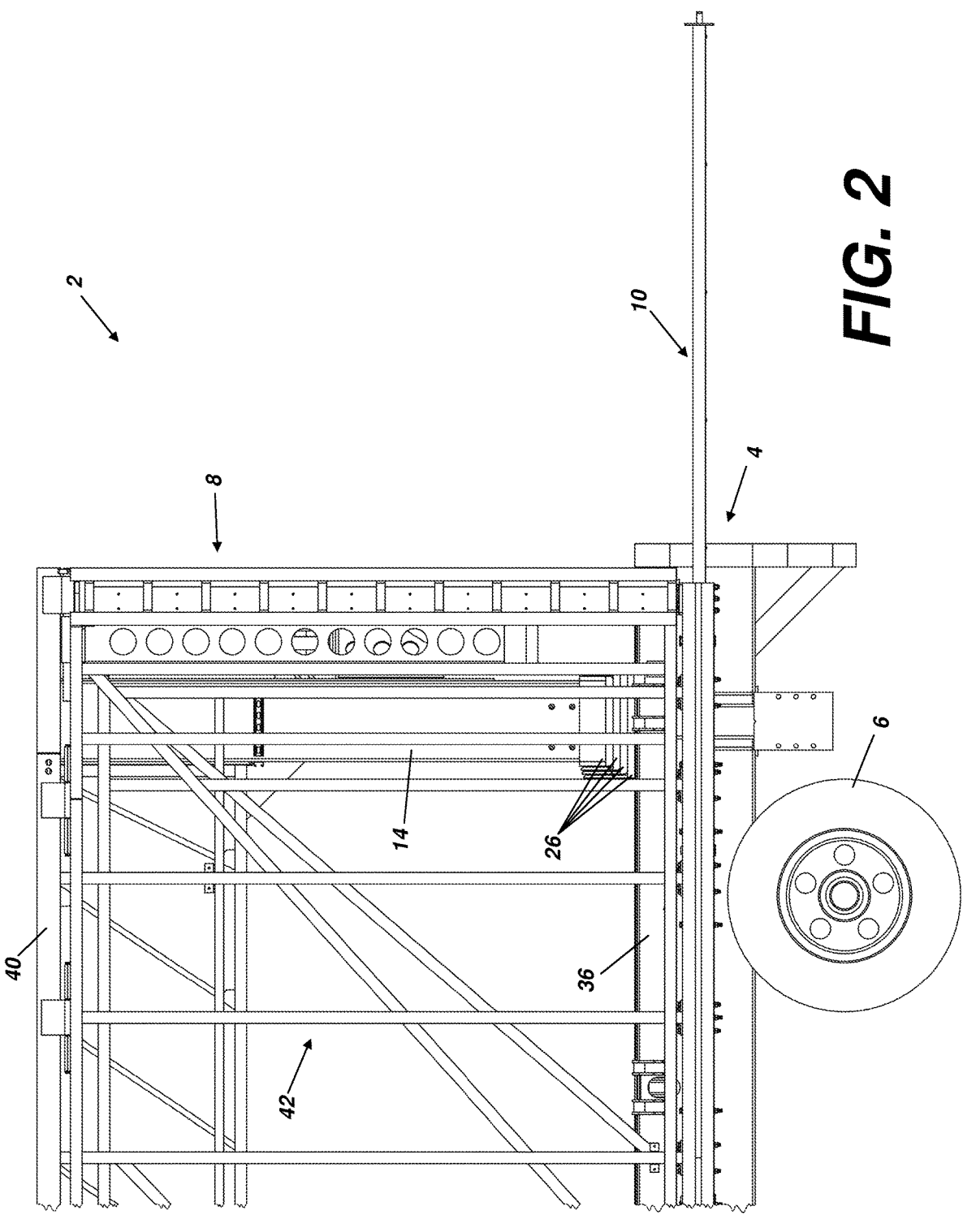
FIG. 2 is a side elevational view thereof, showing the extension of a slide-out speaker wing element.

As shown in FIGS. 1-4, the present invention provides a mobile stage system 2 which generally includes the stage portion 8 and a trailer portion 4 with wheels 6 for transporting the entire assembly, along with jacks or stands 46 for deploying the stage at a location. A tower lifting subsystem comprised of mast towers 44 and mast caps 26 lifted by a six-foot throw solid square hydraulic ram 20 that moves the towers 44 in location in six feet increments is included within the stage portion 8. The towers 44 and caps 26 are pinned through pin holes 18 located in a lifting carriage 16 connected to a mast 14 and the ram 20, as well as pin holes 28 located within the tower caps 26. A square guide 30 as shown in FIG. 5 maintains alignment of the ram 20. FIGS. 1-2 show the stage in the first, stored and trailered orientation.

FIG. 2 shows an extendable sliding speaker wing 10 which has several rollers 12, allowing the entire wing 10 to roll out from the end of one or more of the roof extensions 42. FIGS. 7-11 show these elements in additional detail and orientations. These wings can be pinned in place for storage and transport. These sliding speaker wings are at least 21 feet in length and are sandwiched between two of the wider beams which make up the beams positioned at the front and back of stage positions. When stored within the roof extension section, the extra support from this slidable speaker wing increases the capacity on the upstage and downstage beams by 30 percent.

Figure 4:
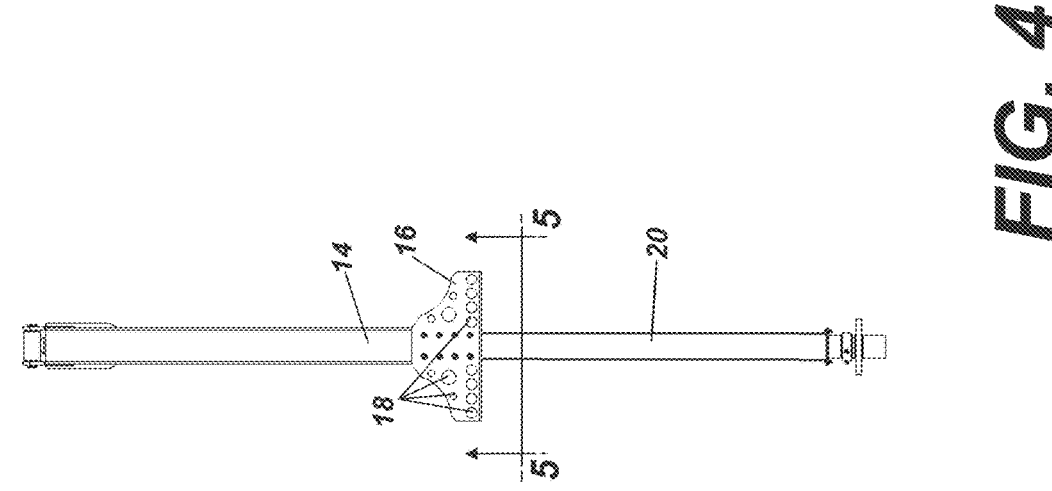
FIG. 4 is a rear elevational view of a hydraulic ram element and lifting carriage element.
Figure 3:
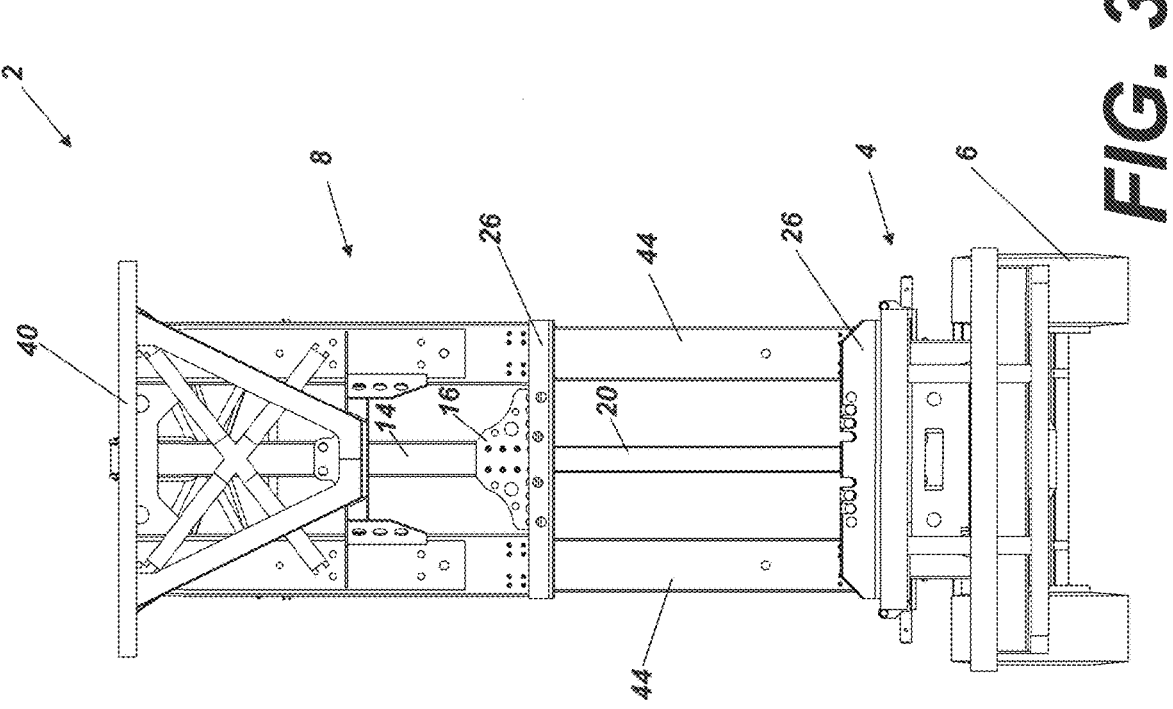
FIG. 3 is a rear elevational view thereof, wherein floor extension elements and roof extension elements are removed to expose elements beneath.
Figure 5:
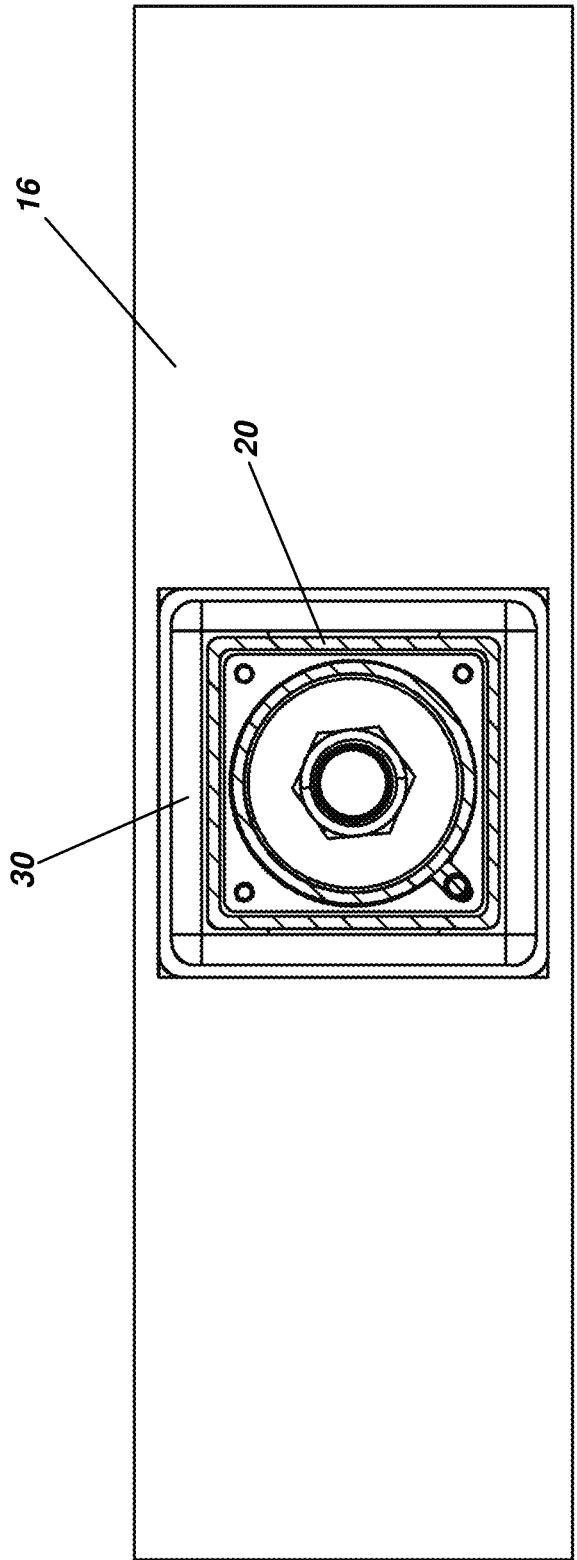
FIG. 5 is a sectional view taken about the line of FIG. 4.
Figure 6:
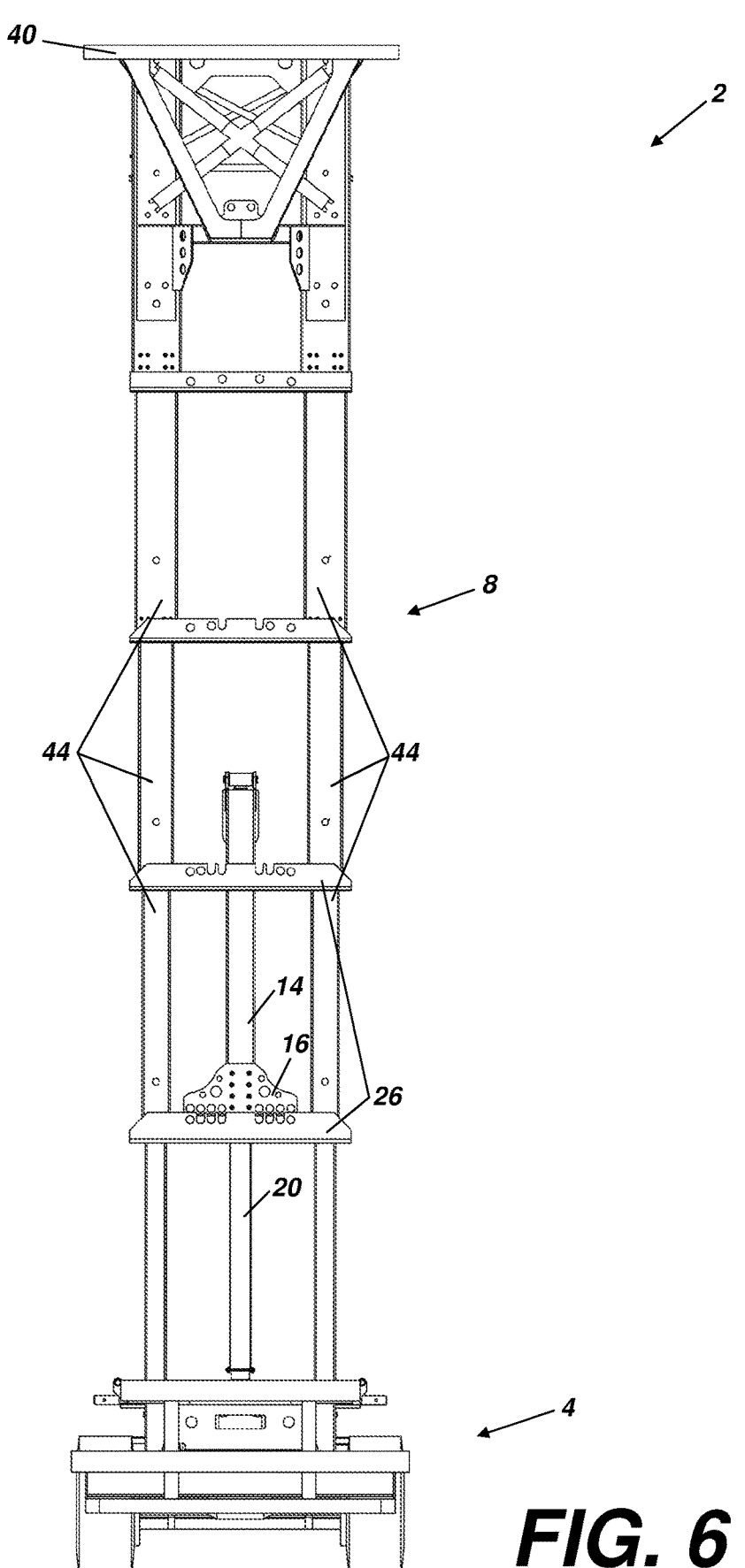
FIG. 6 is a rear elevational view shown in a second orientation wherein the hydraulic ram element and lifting carriage element have lifted and secured several mast tower elements, each comprising a pair of mast columns and their respective mast caps, into place.
Figure 7:
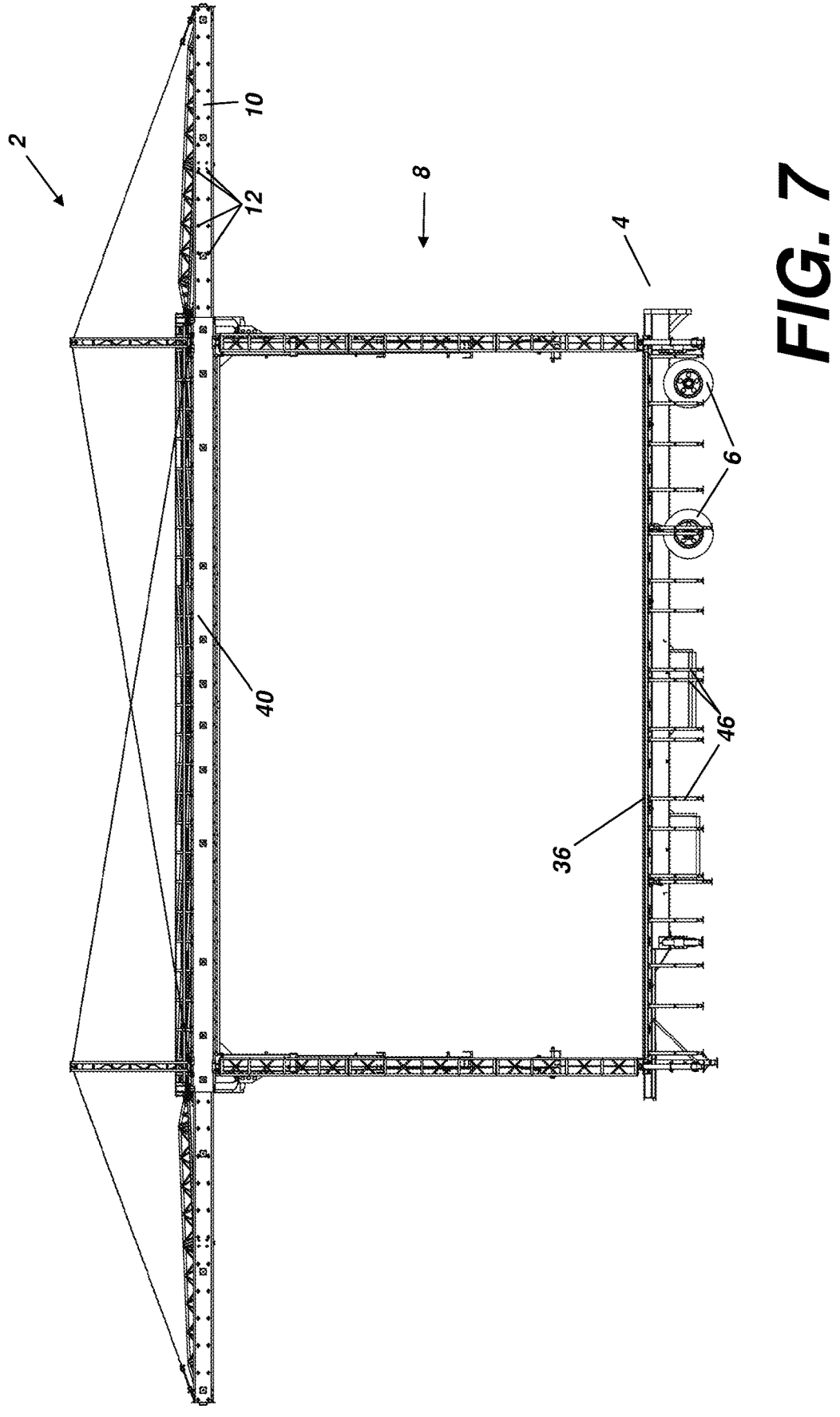
FIG. 7 is a front elevational view of the present invention shown in a third, fully assembled orientation.

FIG. 4 shows the tower lifting subsystem which includes the mast 14, ram 20, and carriage 16 with associated pin holes 18. FIG. 5 shows how the hydraulic ram 20 is protected via the square guide 30 connected to the carriage 16. FIG. 6 shows the entire stage tower assembly in a second, lifted orientation with the towers 44 and caps 26 stacked and pinned in place.

FIGS. 7-11 show in more detail and in several orientations the entire mobile stage system 2 in a third, deployed orientation where floor 38 and ceiling 42 extension elements are folded out and away from their respective floor 36 and ceiling 40 bases.

Figure 8:
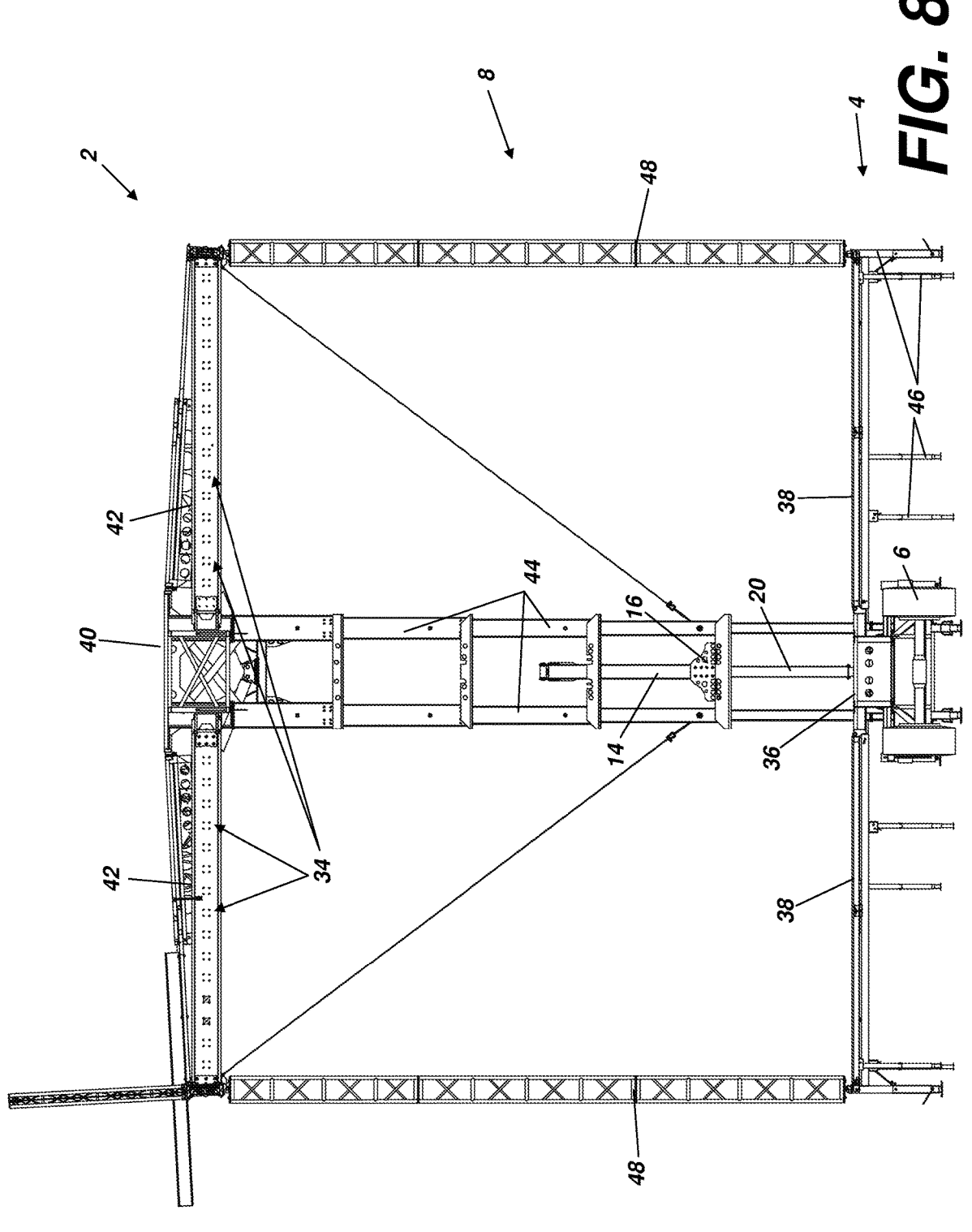
FIG. 8 is a side elevational view thereof.
Figure 9:
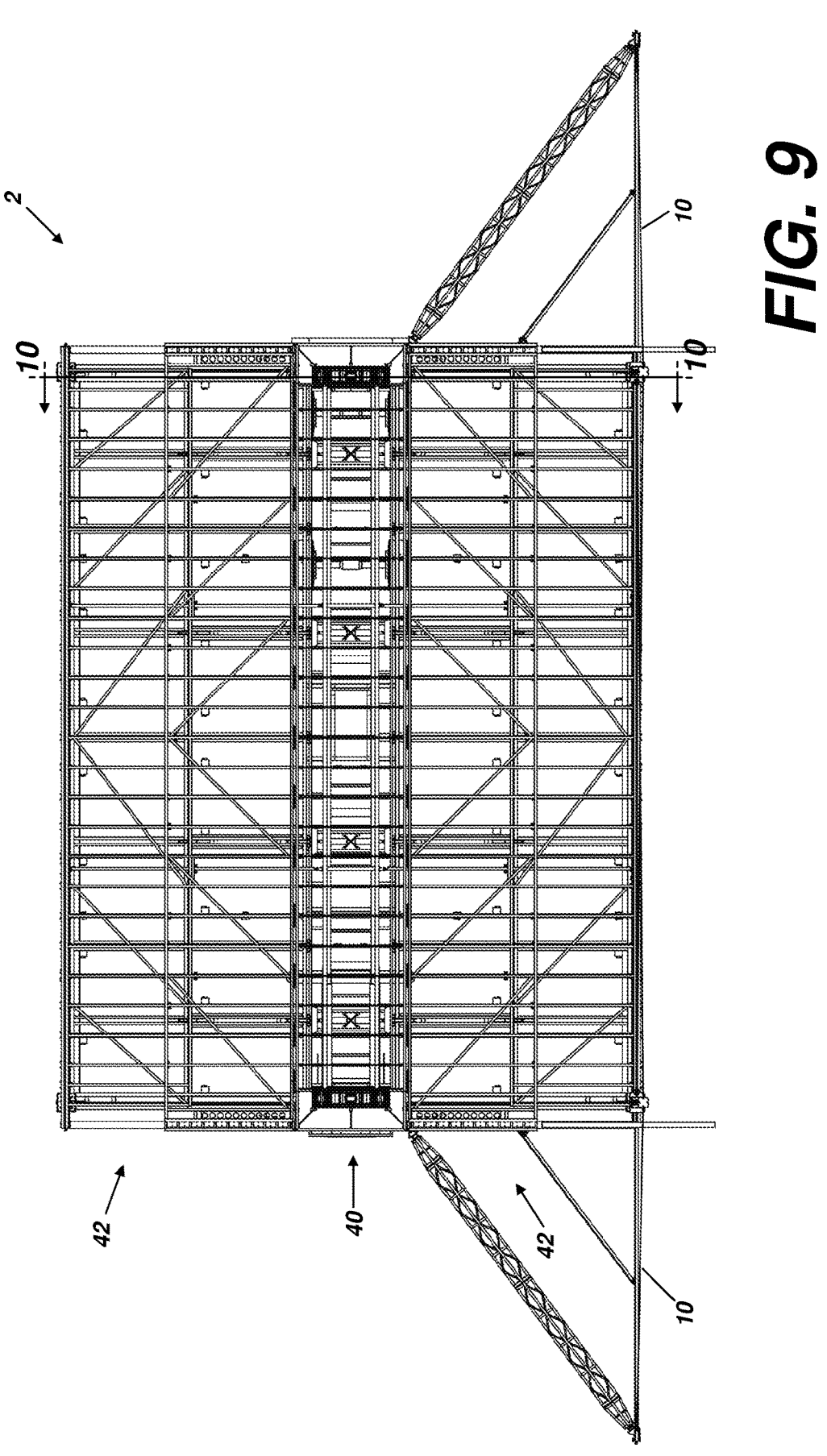
FIG. 9 is a top plan view thereof.
Figure 10:
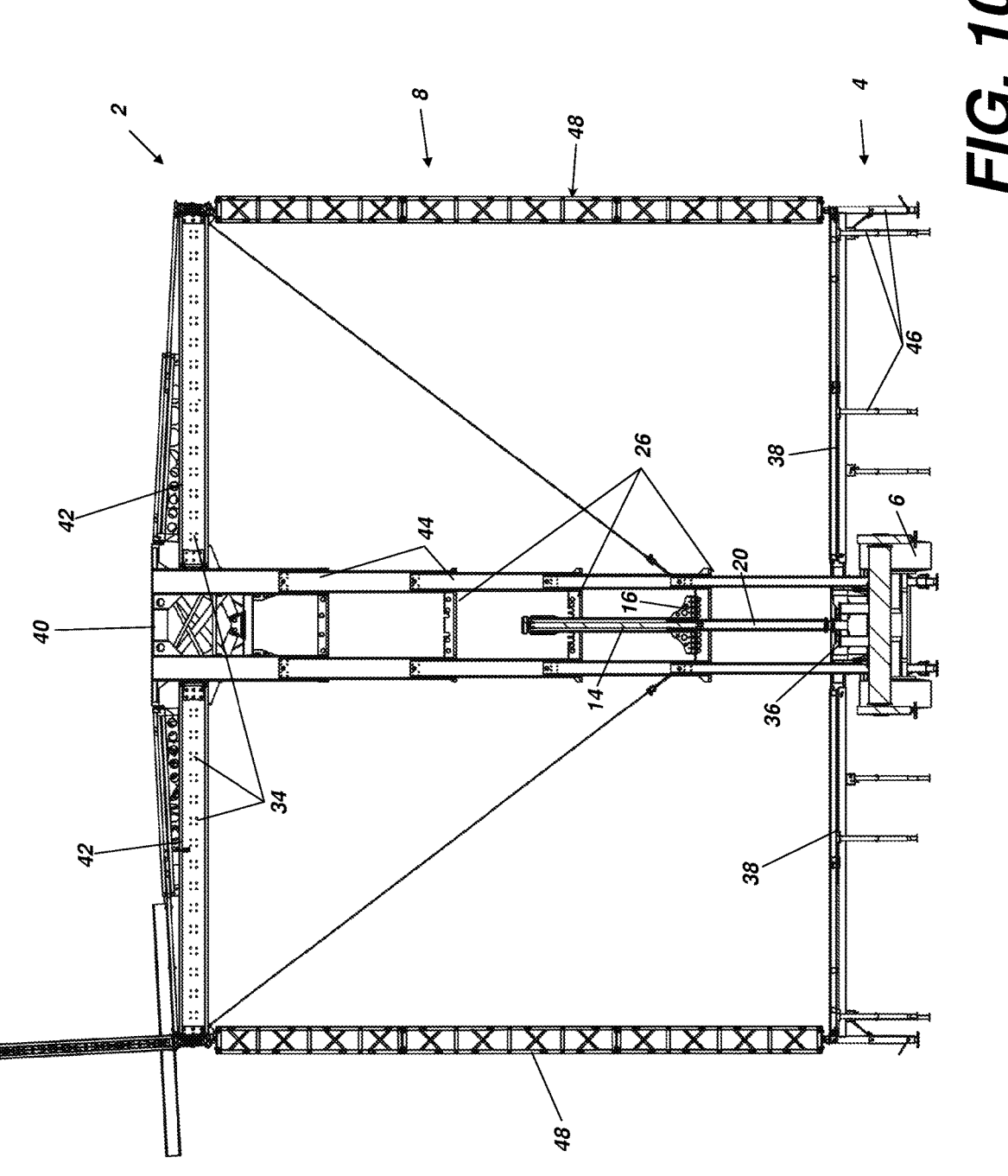
FIG. 10 is a side sectional view taken about the line of FIG. 9.
Figure 11:
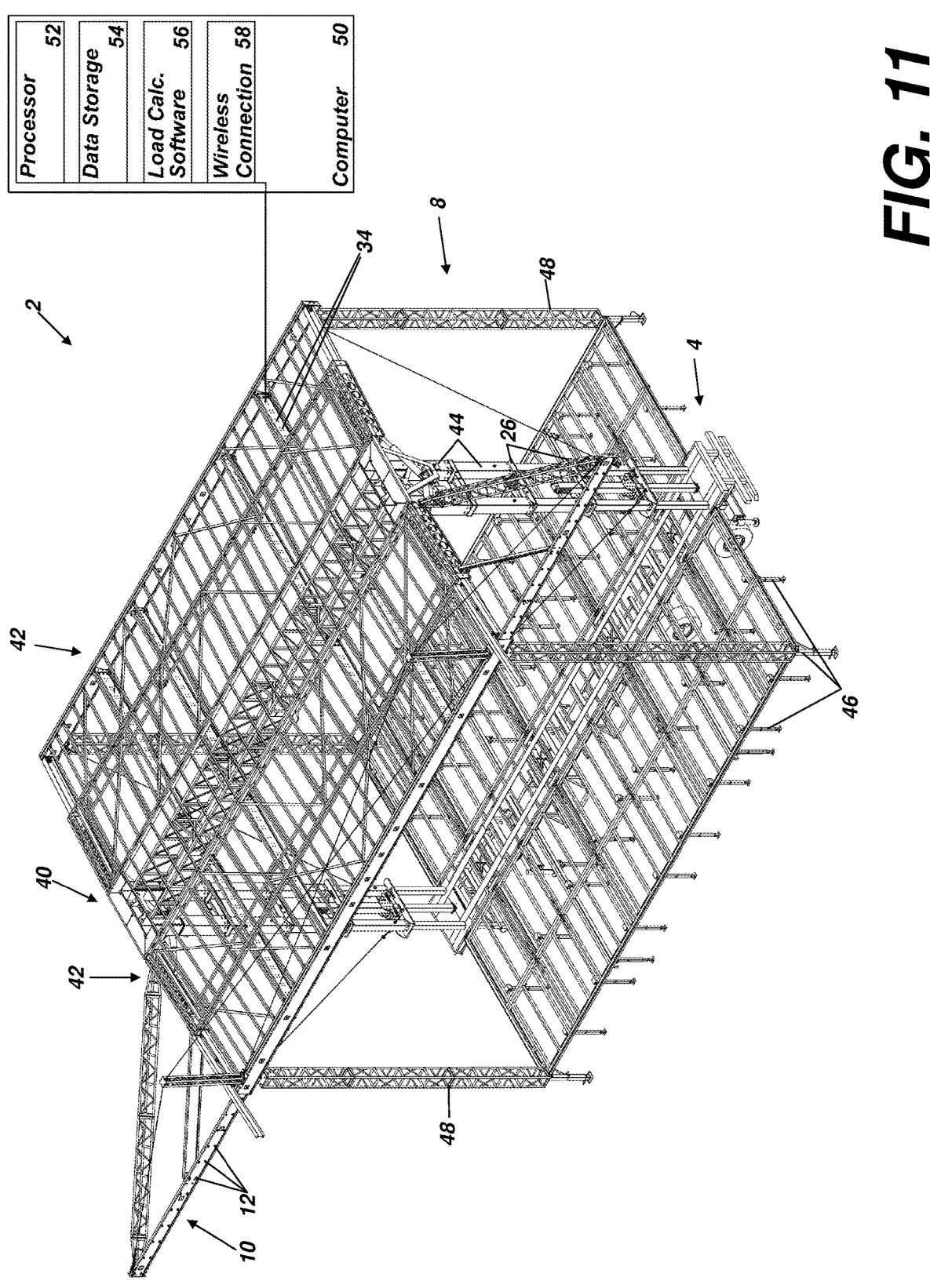
FIG. 11 is a three-dimensional isometric view thereof.

As shown in FIG. 8, beams are installed to form a 1-foot by 1-foot grid system as indicated by the reference numeral 34. This grid system can be easily input into software designed for calculating forces and loads on a structure. Due to the 1×1 grid, force calculations are greatly simplified. FIG. 11 indicates how a computer 50 could be used to receive data or inputs associated with the 1×1 grid 34, data which is processed through a processor 52 using data from a data storage and using a load calculating software 56. A wireless connection 58 could be used to send or receive necessary data from other computing devices located remotely. This software would then quickly and easily determine where areas of overload may occur within the structure, making adjustments easy. A simple spreadsheet could similarly provide the necessary information from this simple structure.

Figure 12:
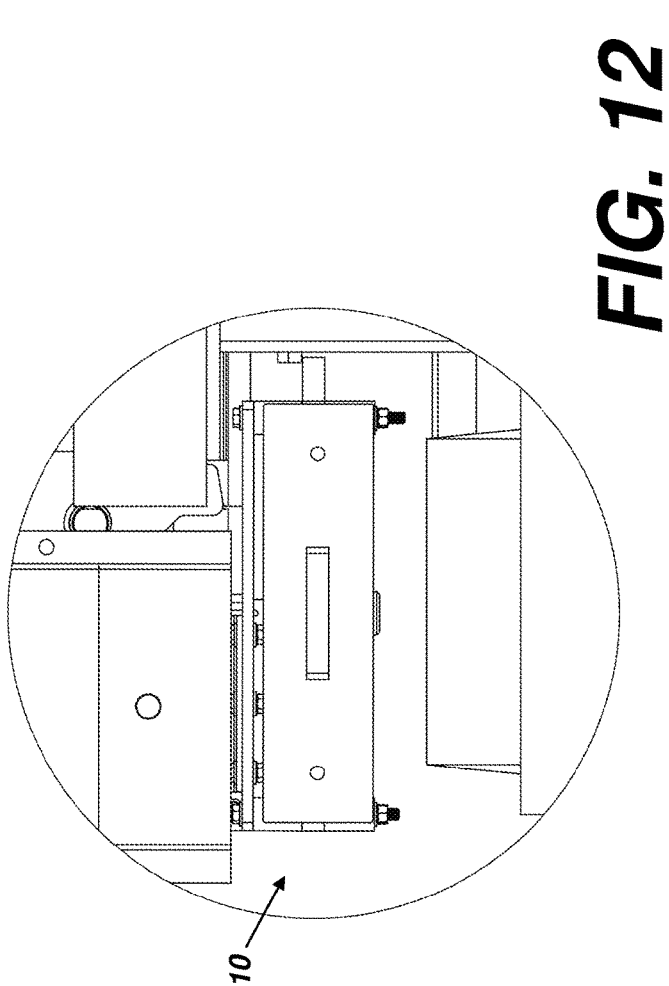
FIG. 12 is a detailed view taken about the circle of FIG. 1.
Figure 13:
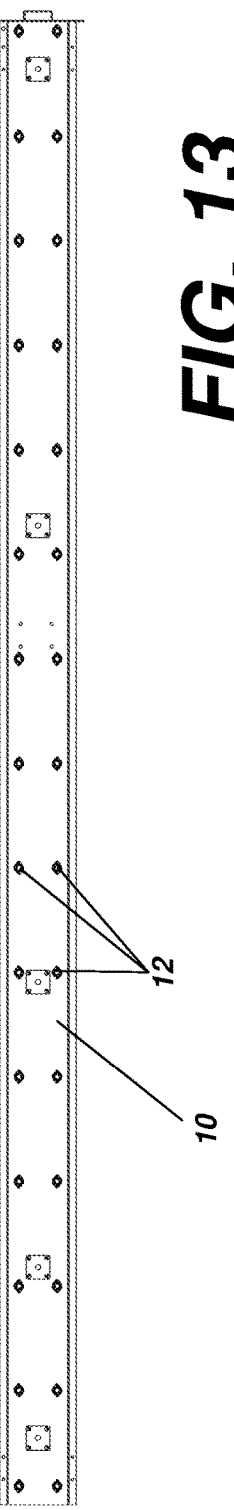
FIG. 13 is a detailed view of the slide out speaker wing element of FIG. 2.

FIGS. 12 and 13 show additional detail for the slidable speaker wing 10 and associated rollers 12.

Here, the spanner beams of the roof are folded flat inside the roof when within the trailer as shown in FIG. 1. When deployed as shown below, these spanner beams are folded out and pinned into place. This both allows the spanner beams to completely span the roof structure when deployed as shown in FIGS. 7-11, and also creates the 1-foot by 1-foot grid.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A mobile stage system comprising:

a stage portion comprising at least a base floor section and at least one floor extension section;

said stage portion further comprising a roof section and at least one roof extension section;

said stage portion affixed to a trailer portion comprising at least four wheels configured to transport said trailer portion and said stage portion;

said stage portion configured to be transformed from a first, stored orientation to a second, deployed orientation;

a tower lifting subsystem connecting said base floor section and said roof section, said tower lifting subsystem comprising a plurality of towers, a plurality of mast caps, a lifting carriage, and a hydraulic ram, whereby said hydraulic ram is configured to lift said plurality of towers and said plurality of mast caps using said lifting carriage such that said plurality of towers and said plurality of mast caps form a stacked tower;

said plurality of towers and said plurality of mast caps configured to be secured into place using a plurality of pins slotted through respective pin hole receivers located in said plurality of towers and said plurality of mast caps;

said at least one roof extension section comprising a sliding speaker wing stored between two beam sections of said at least one roof section, said sliding speaker wing comprising a plurality of rollers;

whereby said sliding speaker wing is configured to be rolled out from within said at least one roof extension such that said sliding speaker wing extends outwardly away from said at least one roof extension;

whereby said sliding speaker wing is further configured to increase structural support of said at least one roof extension when said sliding speaker wing is stored within said at least one roof extension; and said stacked tower configured to lift said roof section a desired distance above said base floor section such that said at least one floor extension section and said at least one roof extension section are extended to generate additional stage area.

2. The system of claim 1, further comprising:

said lifting carriage comprising a square guide configured to receive an end of said hydraulic ram and thereby prevent buckling or misalignment of said hydraulic ram.

3. The system of claim 1, further comprising at least one pin configured to pin said slidable speaker wing when said slidable speaker wing is stored.

* * * * *